(12) United States Patent
Motohashi

(10) Patent No.: US 11,691,585 B2
(45) Date of Patent: Jul. 4, 2023

(54) IMAGE PROCESSING APPARATUS, IMAGING DEVICE, MOVING BODY DEVICE CONTROL SYSTEM, IMAGE PROCESSING METHOD, AND PROGRAM PRODUCT

(71) Applicant: Ricoh Company, Ltd., Tokyo (JP)

(72) Inventor: Naoki Motohashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 398 days.

(21) Appl. No.: 16/122,445

(22) Filed: Sep. 5, 2018

(65) Prior Publication Data
US 2019/0001910 A1    Jan. 3, 2019

Related U.S. Application Data

(63) Continuation of application No. PCT/JP2017/002393, filed on Jan. 24, 2017.

(30) Foreign Application Priority Data

Mar. 10, 2016    (JP) ................... 2016-047574

(51) Int. Cl.
*B60R 21/02* (2006.01)
*G06T 7/00* (2017.01)
(Continued)

(52) U.S. Cl.
CPC ............. *B60R 21/02* (2013.01); *B60R 21/00* (2013.01); *G06T 1/60* (2013.01); *G06T 7/00* (2013.01);
(Continued)

(58) Field of Classification Search
CPC ... B60R 21/02; B60R 21/00; B60R 2021/003; B60R 2021/01259; G06K 9/00791; G06T 1/60; G06T 7/00; G08G 1/16
See application file for complete search history.

(56) References Cited

U.S. PATENT DOCUMENTS 7,787,712 B2    8/2010  Takahashi et al.
7,982,141 B2    7/2011  Takahashi et al.
(Continued)

FOREIGN PATENT DOCUMENTS

EP    2741233 A2    6/2014
EP    2767927 A2    8/2014
(Continued)

OTHER PUBLICATIONS

Zhao et al., Detection of Non-flat Ground Surfaces Using V-Disparity Images, 2009 IEEE/RSJ International Conference on Intelligent Robots and Systems (Year: 2009).*
(Continued)

*Primary Examiner* — Navid Z. Mehdizadeh
(74) *Attorney, Agent, or Firm* — Xsensus LLP

(57) ABSTRACT

An image processing apparatus includes one or more processors; and a memory, the memory storing instructions, which when executed by the one or more processors, cause the one or more processors to generate vertical direction distribution data indicating a frequency distribution of distance values with respect to a vertical direction of a range image, from the range image having distance values according to distance of a road surface in a plurality of captured images captured by a plurality of imaging parts; set a search range corresponding to a predetermined reference point in the vertical direction distribution data and extract a plurality of pixels from the search range; and detect a road surface, based on the plurality of extracted pixels.

7 Claims, 12 Drawing Sheets

(51) Int. Cl.
  *G06T 1/60* (2006.01)
  *G08G 1/16* (2006.01)
  *B60R 21/00* (2006.01)
  *G06V 20/56* (2022.01)
  *B60R 21/01* (2006.01)

(52) U.S. Cl.
  CPC .............. *G06V 20/56* (2022.01); *G08G 1/16* (2013.01); *B60R 2021/003* (2013.01); *B60R 2021/01259* (2013.01)

(56) References Cited

U.S. PATENT DOCUMENTS

| | | | |
|---|---|---|---|
| 9,330,320 | B2 | 5/2016 | Takahashi et al. |
| 9,886,649 | B2 | 2/2018 | Kakegawa et al. |
| 2007/0195370 | A1 | 8/2007 | Suga et al. |
| 2009/0003700 | A1* | 1/2009 | Xiao ................ G06K 9/346 382/176 |
| 2013/0163821 | A1* | 6/2013 | You .................. G06K 9/00798 382/104 |
| 2015/0049195 | A1 | 2/2015 | Ishigaki et al. |
| 2015/0227800 | A1* | 8/2015 | Takemae ........... G06K 9/00798 382/104 |
| 2015/0294160 | A1* | 10/2015 | Takahashi ............ H04N 13/204 382/104 |
| 2016/0014406 | A1 | 1/2016 | Takahashi et al. |
| 2016/0019429 | A1 | 1/2016 | Ishigaki et al. |
| 2016/0253575 | A1* | 9/2016 | Kakegawa ........... G06K 9/6212 701/70 |
| 2017/0151850 | A1* | 6/2017 | Deigmoller ........ B60G 17/0165 |
| 2018/0120108 | A1* | 5/2018 | Takahashi .............. G01C 11/06 |
| 2018/0276835 | A1* | 9/2018 | Amano .................... G08G 1/16 |

FOREIGN PATENT DOCUMENTS

| | | |
|---|---|---|
| EP | 2921992 A2 | 9/2015 |
| JP | 2014-225220 | 12/2014 |
| JP | 2015-057690 | 3/2015 |
| JP | 2015-075800 | 4/2015 |
| JP | 2015-195018 | 11/2015 |
| WO | 2017/090326 A1 | 6/2017 |

OTHER PUBLICATIONS

International Search Report dated Mar. 14, 2017 in PCT/JP2017/002393 Filed on Jan. 24, 2017 (with English translation).
Written Opinion dated Mar. 14, 2017 in PCT/JP2017/002393 Filed on Jan. 24, 2017.
European Search Report dated Jul. 12, 2019, issued in corresponding European Application No. 17762735.3, 9 pages.

* cited by examiner

CAPTURED IMAGE

V-MAP   DISPARITY

CAPTURED IMAGE

V-MAP

IMAGE PROCESSING APPARATUS, IMAGING DEVICE, MOVING BODY DEVICE CONTROL SYSTEM, IMAGE PROCESSING METHOD, AND PROGRAM PRODUCT

CROSS-REFERENCE TO RELATED APPLICATIONS

The present application is a continuation application of International Application No. PCT/JP2017/002393, filed on Jan. 24, 2017, which claims priority to Japanese Patent Application No. 2016-047574, filed on Mar. 10, 2016. The contents of these applications are incorporated herein by reference in their entirety.

BACKGROUND OF THE INVENTION

1. Field of the Invention

The disclosures discussed herein relate to an image processing apparatus, an imaging device, a moving body device control system, an image processing method, and a program product.

2. Description of the Related Art

In vehicle safety, automobile body structures and the like have been developed from the perspectives of pedestrian and passenger protection against collision with pedestrians and other automobiles. Recent advances in information processing and image processing technologies have led to the development of high rate detection techniques for detecting people, automobiles, etc. Automobiles applied with these technologies are already on sale; such automobiles automatically apply brakes before collision in order to prevent collision.

In order to apply brakes automatically, measuring a distance between an automobile and an object such as a person, another automobile, etc. is mandatory; hence, measurement using images of stereo cameras has been put into practical use for that reason.

An object recognition technique for recognizing an object such as a person or another vehicle by performing the following image processing is known in the related art, in measurement using images captured by such a stereo camera (see, e.g., Patent Document 1).

According to this technique, first, a V-Disparity image is generated with a vertical coordinate of an image as one axis, disparity of the image as the other axis, and a value of disparity frequency as a pixel value, from a plurality of images captured by a stereo camera. Next, a road surface is detected from the generated V-Disparity image. After removing noise using the detected road surface, a U-Disparity image is generated with a horizontal coordinate of an image as a vertical axis, parallax of the image as the horizontal axis, and the disparity frequency as the pixel value. Then, an object such as a person or another vehicle is recognized based on the generated U-Disparity image.

However, in the related art technique, noise is generated in parallax due to reflection of a road surface in rainy weather and the road surface is unable to be accurately measured.

Related-Art Document

Patent Document

[Patent Document 1] Japanese Unexamined Patent Application Publication No. 2015-075800

SUMMARY OF THE INVENTION

According to an aspect of the disclosure, an image processing apparatus includes
one or more processors; and
a memory, the memory storing instructions, which when executed by the one or more processors, cause the one or more processors to:
generate vertical direction distribution data indicating a frequency distribution of distance values with respect to a vertical direction of a range image, from the range image having distance values according to distance of a road surface in a plurality of captured images captured by a plurality of imaging parts;
set a search range corresponding to a predetermined reference point in the vertical direction distribution data and extract a plurality of pixels from the search range; and detect a road surface, based on the plurality of extracted pixels.

BRIEF DESCRIPTION OF THE DRAWINGS

Other objects and further features of embodiments will be apparent from the following detailed description when read in conjunction with the accompanying drawings, in which.

DESCRIPTION OF THE EMBODIMENTS

The following illustrates a moving body device control system having an image processing apparatus according to an embodiment.

<Configuration of in-Vehicle Device Control System>

Figure 1:
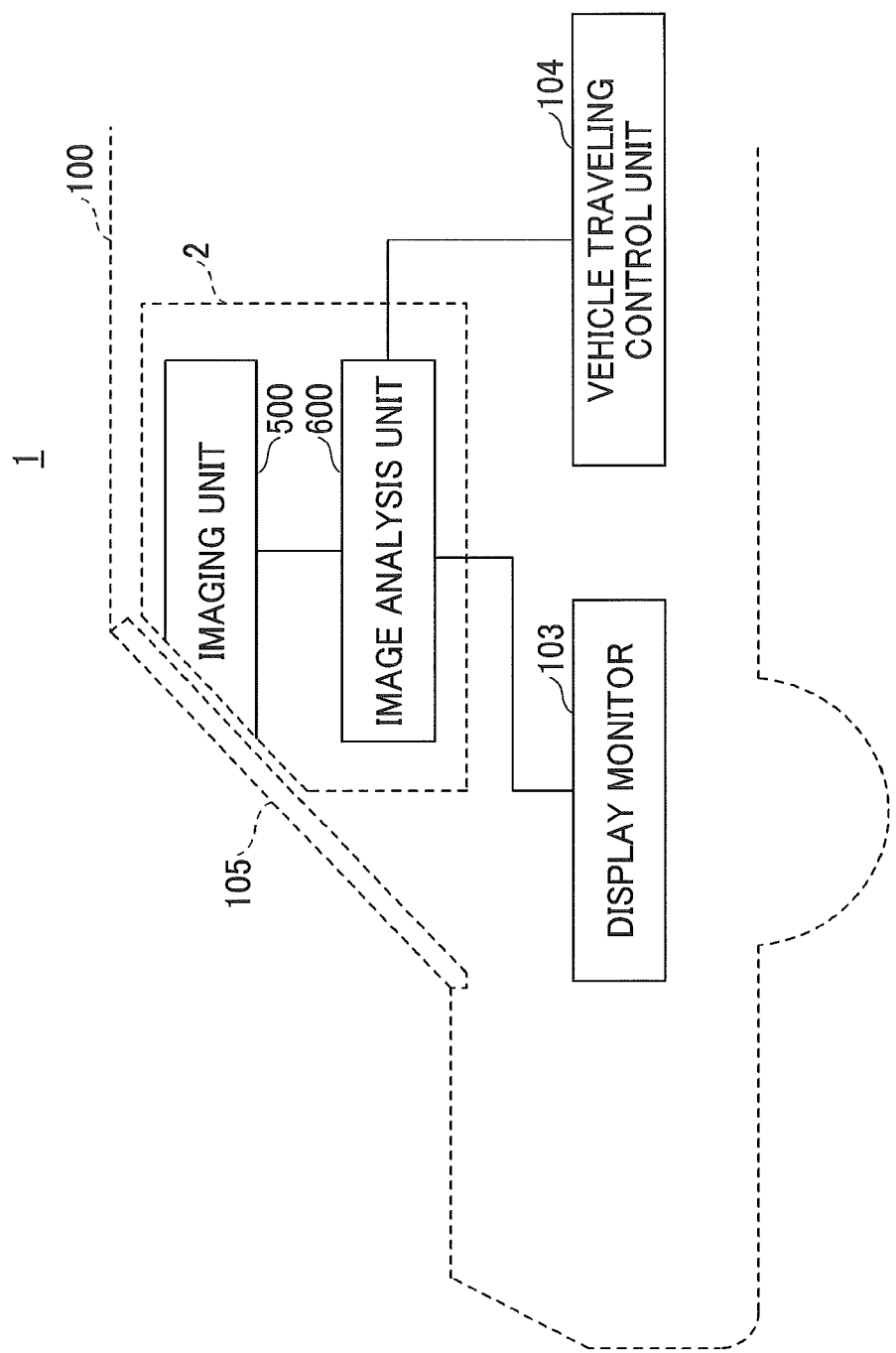
FIG. 1 is a schematic diagram illustrating a configuration of an in-vehicle device control system, according to an embodiment.

FIG. 1 is a diagram illustrating a configuration of an in-vehicle device control system acting as a moving body device control system, according to an embodiment of the present invention.

The in-vehicle device control system 1 is installed in a reference vehicle 100 such as an automobile that is a moving body. The in-vehicle device control system 1 includes an imaging unit 500, an image analysis unit 600, a display monitor 103, and a vehicle traveling control unit 104. The in-vehicle device control system 1 detects relative height information (information indicating relative inclination condition) of a road surface (moving body traveling surface) ahead of the reference vehicle, from image data each having an image of a forward region of the moving body in a reference vehicle traveling direction (imaging region) obtained by the imaging unit 500, detects a three-dimensional shape of the traveling road surface ahead of the reference vehicle from the detection result of the relative height information, and controls the moving body and various in-vehicle devices using the detection result of the three-dimensional shape of the traveling road surface.

The control of the moving body includes, for example, transmission of alert signs, control of a steering wheel of the reference vehicle 100 (reference moving body), or braking of the reference vehicle 100 (the reference moving body).

For example, the imaging unit 500 is disposed in the vicinity of a rear-view mirror (not illustrated) of a windshield 105 of the reference vehicle 100. Various data such as captured image data obtained by the imaging unit 500 are input into the image analysis unit 600 acting as an image processing unit.

The image analysis unit 600 analyzes data transmitted from the imaging unit 500, detects a relative height (positional information) at each point on a road surface ahead of the reference vehicle with respect to a road surface portion (a road surface portion directly beneath the reference vehicle) on which the reference vehicle 100 is traveling, and obtains a three-dimensional shape of the (moving body) traveling road surface ahead of the reference vehicle. Further, the image analysis unit 600 recognizes recognition target objects such as other vehicles, pedestrians, various obstacles, etc., ahead of the reference vehicle.

The analysis results of the image analysis unit 600 are sent to the display monitor 103 and the vehicle traveling control unit 104. The display monitor 103 displays captured image data obtained by the imaging unit 500 and analysis results. The vehicle traveling control unit 104 may, for example, send an alert sign to a driver of the reference vehicle 100 or perform traveling support control such as control of the steering wheel and braking of the reference vehicle, based on the recognition results of a recognition target object obtained by the image analysis unit 600, such as another vehicle, pedestrian, and various obstacles ahead of the vehicle.

<Configurations of Imaging Unit 500 and Image Analysis Unit 600>

Figure 2:
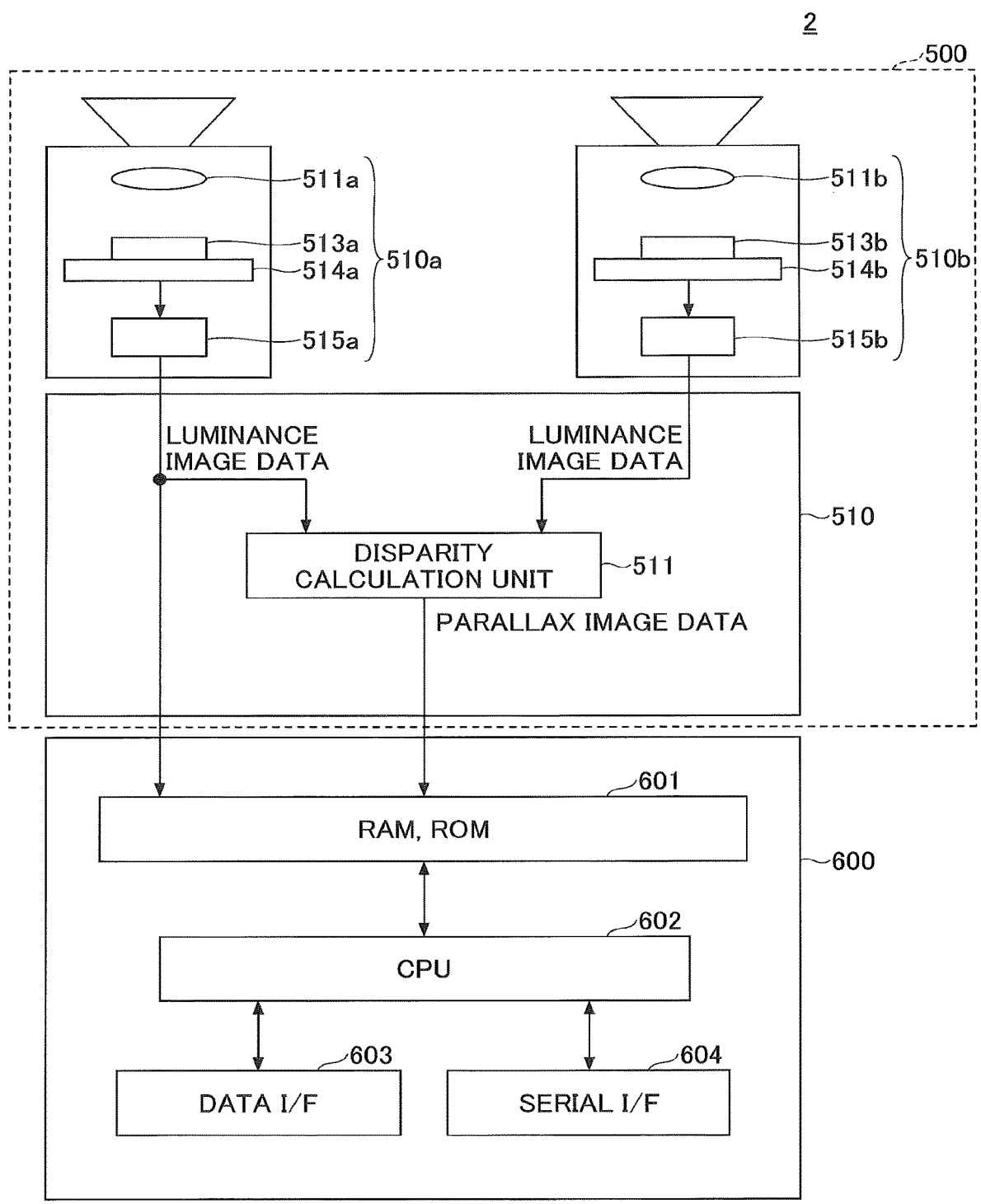
FIG. 2 is a schematic diagram illustrating configurations of an imaging unit and an image analysis unit, according to an embodiment.

FIG. 2 is a diagram illustrating configurations of the imaging unit 500 and the image analysis unit 600 according to an embodiment.

The imaging unit 500 includes a stereo camera having two imaging parts 510a and 510b as imaging units. The two imaging parts 510a and 510b are the same components. The imaging parts 510a and 510b include imaging lenses 511a and 511b, sensor substrates 514a and 514b including image sensors 513a and 513b having two-dimensionally arranged light receiving elements, and signal processors 515a and 515b configured to generate and output captured image data obtained by converting analog electric signals output from the sensor substrates 514a and 514b (electric signals corresponding to amounts of light received by respective light receiving elements on the image sensors 513a and 513b) into digital electric signals. The imaging unit 500 outputs luminance image data and parallax image data.

In addition, the imaging unit 500 includes a process hardware unit 510 including a Field-Programmable Gate Array (FPGA) or the like. In order to obtain parallax images from the luminance image data output from the imaging parts 510a and 510b, the process hardware unit 510 includes a disparity calculation unit 511 as a parallax image information generation unit to calculate a disparity value of a corresponding image portion between the respective captured images captured by the imaging parts 510a and 510b.

The disparity value referred to in this case is a value obtained by taking one of the captured images captured by the imaging parts 510a and 510b as a reference image, and the other one as a comparison image, and calculating a positional deviation corresponding to a same point within the imaging region of an image portion on the comparison image with respect to an image portion on the reference image, as a disparity value of the image portion. By utilizing the principle of triangulation, a distance to the same point within an imaging region corresponding to the image portion may be calculated based on the disparity value of the image portion.

The image analysis unit 600 is configured to include an image processing board or the like; the image analysis unit 600 includes a storage unit 601 having a RAM, a ROM or the like configured to store the luminance image data and the parallax image data output from the imaging unit 500, a central processing unit (CPU) 602 configured to execute a computer program for performing disparity calculation control and the like, a data interface (I/F) 603, and a serial I/F 604.

The FPGA constituting the process hardware unit 510 executes a process requiring real-time processing on image data, for example, gamma correction, distortion correction (parallelization of left and right captured images), and disparity calculation by block matching to generate parallax images and write the generated information in the RAM of the image analysis unit 600. The CPU of the image analysis unit 600 is responsible for control of an image sensor control unit of each of the imaging parts 510a and 510b and overall control of the image processing board. The CPU of the image analysis unit 600 also loads a program for executing a process of detecting a three-dimensional shape of a road surface, a process of detecting various objects (objects) such as guardrails, and the like from the ROM, executes various kinds of processes by inputting the luminance image data and the parallax image data stored in the RAM, and outputs the process results to the outside from the data I/F 603 and the serial I/F 604. Upon execution of such processes, vehicle operation information, such as vehicle velocity and acceleration (mainly acceleration in a longitudinal direction of the vehicle), steering angle, and yaw rate of the reference vehicle 100, is input via the data I/F 603, and used as parameters of various kinds of processes. The data output to the outside may be used as input data for controlling the various devices of the reference vehicle 100 (brake control, vehicle velocity control, warning control, etc.).

Note that the imaging unit 500 and the image analysis unit 600 may integrally form an imaging device 2, as an integrated device.

Figure 3:
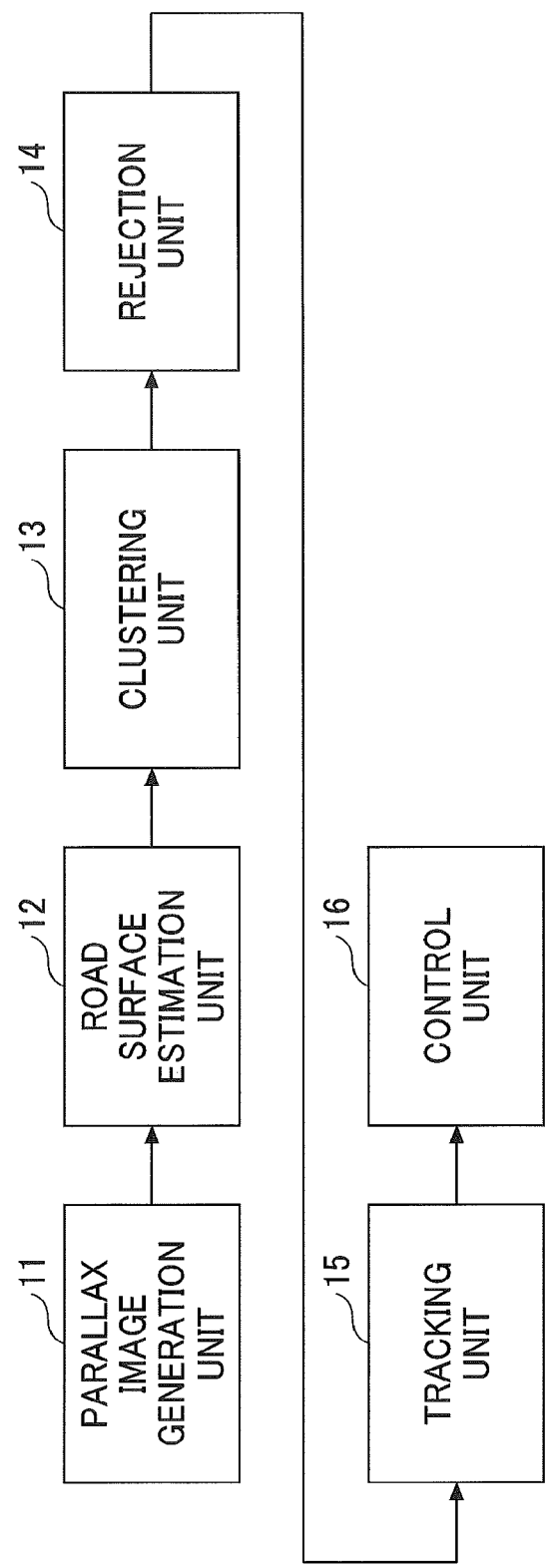
FIG. 3 is a functional block diagram illustrating a moving body device control system, according to an embodiment.

FIG. 3 is a functional block diagram of an in-vehicle device control system 1 implemented by the process hardware unit 510, the image analysis unit 600, and the vehicle traveling control unit 104 in FIG. 2. Note that a functional unit implemented by the image analysis unit 600 is implemented by a process executed by the CPU 602 of the image analysis unit 600 by one or more programs installed in the image analysis unit 600.

The following illustrates processes according to an embodiment.

<Parallax Image Generation Process>

A parallax image generation unit 11 performs a parallax image generation process for generating parallax image data (parallax image information). Note that the parallax image generation unit 11 is constituted by, for example, a disparity calculation unit 511 (FIG. 2).

The parallax image generation process includes, first, setting the luminance image data of one imaging part 510a of the two imaging parts 510a and 510b as reference image data, setting the luminance image data of the other imaging part 510b as comparison image data, calculating disparity between the two sets of the luminance image data, generating parallax image data based on the calculated disparity, and outputting the generated parallax image data. The parallax image data indicates a parallax image including respective image portions with respective pixel values according to disparities d calculated for respective image portions on the reference image data.

Specifically, the parallax image generation unit 11 defines a block including a plurality of pixels (e.g., 16 pixels×1 pixel) having one target pixel in the center with respect to a certain row of the reference image data. By contrast, in the same row in the comparison image data, a correlation value, which indicates a correlation between a feature quantity indicating a feature of pixel values of a block defined in the reference image data and a feature quantity indicating a feature of pixel values of a corresponding block in the comparison image data, is calculated by shifting a block having the same size as the block of the defined reference image data pixel by pixel in the horizontal line direction (x direction). Then, based on the calculated correlation values, a matching process is performed to select a block of the comparison image data having the highest correlation with the block of the reference image data from among the blocks in the comparison image data. Thereafter, the positional deviation between the target pixel of the block of the reference image data and the corresponding pixel of the block of the comparison image data selected by the matching process is calculated as a disparity value d. The parallax image data may be obtained by performing such a process of calculating a disparity value d on the entire region or a specific region of the reference image data.

As a feature quantity of the block for the matching process, a value (luminance value) of each pixel within a block may be used, for example. As the correlation value, the sum of the absolute values of the difference between the value (luminance value) of each of pixels in the block of the reference image data and the value (luminance value) of a corresponding one of pixels in the block of the comparison image data may be used, for example. In this case, the block having the smallest sum has the highest correlation.

For the matching process in the parallax image generation unit 11 to be implemented by the hardware process, methods such as SSD (Sum of Squared Difference), ZSSD (Zero-mean Sum of Squared Difference), SAD (Sum of Absolute Difference), ZSAD (Zero-mean Sum of Absolute Difference), NCC (Normalized cross correlation), and the like may be used. Note that in the matching process, disparity values are calculated only on a pixel basis; hence, when a disparity value of less than one pixel is required, it is necessary to use an estimated value. As an estimation method for a disparity value of less than one pixel, for example, an equiangular linear fitting method, a curve fitting method or the like may be used.

<Road Surface Estimation>

The road surface estimation unit 12 estimates (detects) a road surface, based on a parallax image generated by the parallax image generation unit 11.

Figure 4:
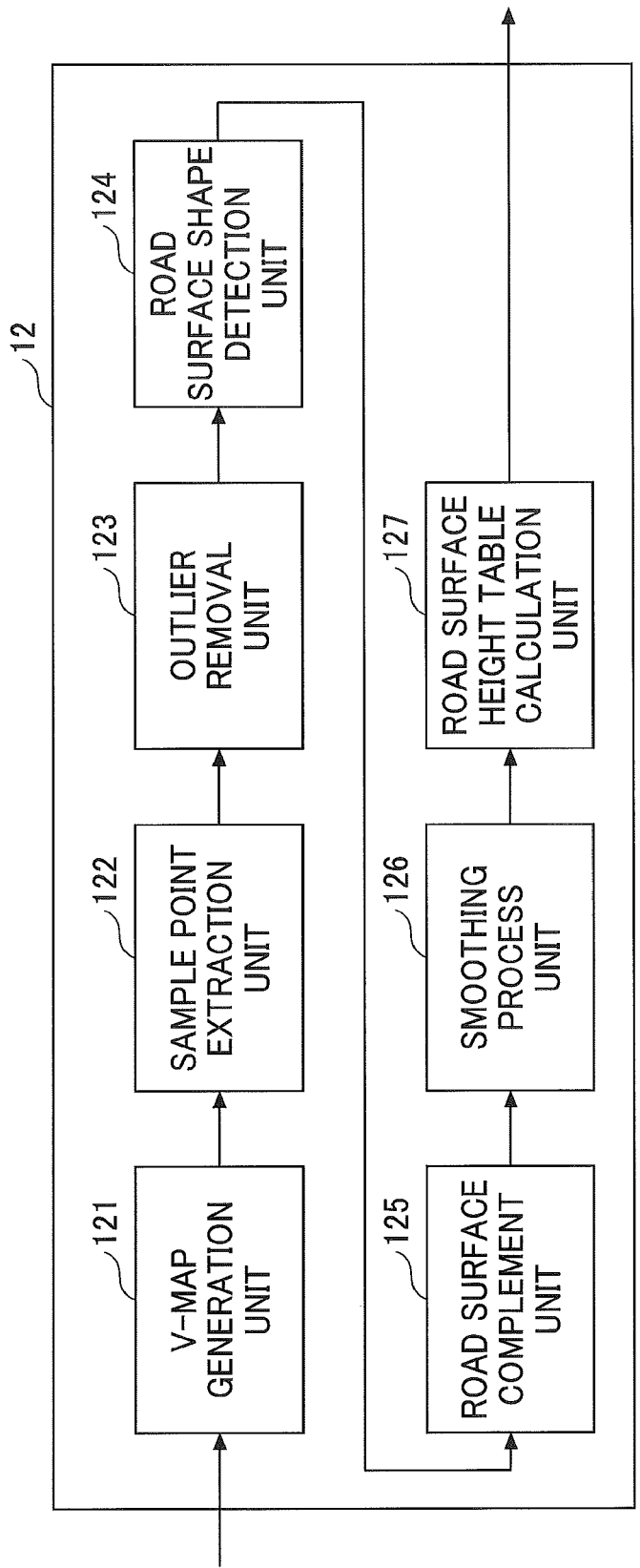
FIG. 4 is a functional block diagram of a road surface estimation unit.

The functional configuration of the road surface estimation unit 12 will be described with reference to FIG. 4. FIG. 4 is a functional block diagram of the road surface estimation unit 12.

The road surface estimation unit 12 includes a V-map generation unit 121, a sample point extraction unit 122, an outlier removal unit 123, a road surface shape detection unit 124, a road surface complement unit 125, a smoothing process unit 126, and a road surface height table calculation unit 127.

The following illustrates respective processes of functional units of the road surface estimation unit 12.

<<V-Map Generation Process>>

The V-map generation unit 121 executes a V-map generation process for generating a V-map (a V-Disparity Map, an example of "vertical direction distribution data"), based on parallax pixel data. Each parallax pixel data included in the parallax image data is indicated by a set (x, y, d) of an x direction position, a y direction position, and a disparity value d. The parallax pixel data that is transformed into three-dimensional coordinate information (d, y, f), where d is set on the X axis, y is set on the Y axis, and frequency f is set on the Z axis may be generated as parallax histogram information. Or, three dimensional coordinate information (d, y, f) that is limited to information exceeding a predetermined frequency threshold value from this three-dimensional coordinate information (d, y, f) may be generated as parallax histogram information. The parallax histogram information of the present embodiment includes three-dimensional coordinate information (d, y, f), and this three-dimensional histogram information distributed in the XY two-dimensional coordinate system is referred to as a V-map (V-disparity map).

More specifically, the V-map generation unit 121 calculates disparity value frequency distribution for each row region of the parallax image data obtained by dividing a parallax image into multiple parts in a vertical direction. The information indicating the disparity value frequency distribution is parallax histogram information.

Figure 5A:
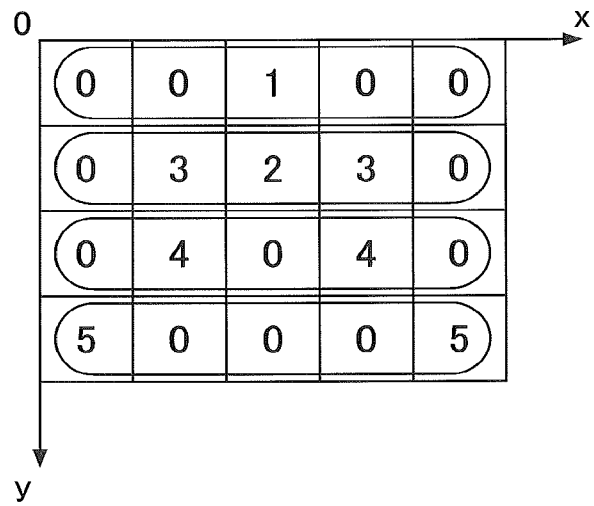
FIG. 5A is a diagram illustrating parallax image data and a V-map generated from the parallax image data.
Figure 5B:
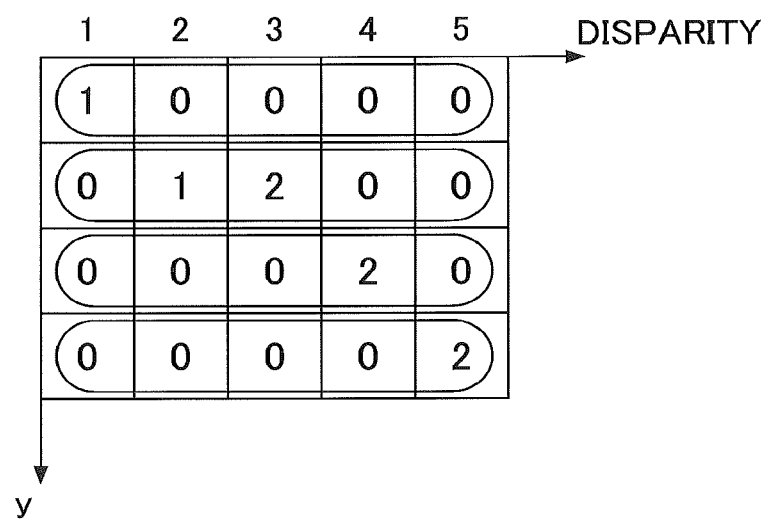
FIG. 5B is a diagram illustrating parallax image data and a V-map generated from the parallax image data.

FIGS. 5A and 5B are diagrams illustrating parallax image data and a V-map generated from the parallax image data. FIG. 5A is a diagram illustrating an example of disparity value distribution of a parallax image, and FIG. 5B is a diagram illustrating a V-map indicating the disparity value frequency distribution by each row of the parallax image in FIG. 5A.

When receiving an input of parallax image data having a disparity value distribution as illustrated in FIG. 5A, the V-map generation unit 121 calculates a disparity value frequency distribution that is a distribution of the number of data sets for each disparity value per row, and outputs the calculated disparity value frequency distribution as parallax histogram information. A V-map as illustrated in FIG. 5B may be obtained by representing information on the disparity value frequency distribution for each row obtained in this manner on a two-dimensional orthogonal coordinate system, where a y-direction position (vertical position of the captured image) on the parallax image is taken on the Y-axis and the disparity value is taken on the X-axis. The V-map may be expressed as an image in which pixels having pixel values according to the frequency f are distributed on the two-dimensional orthogonal coordinate system.

Figure 6A:
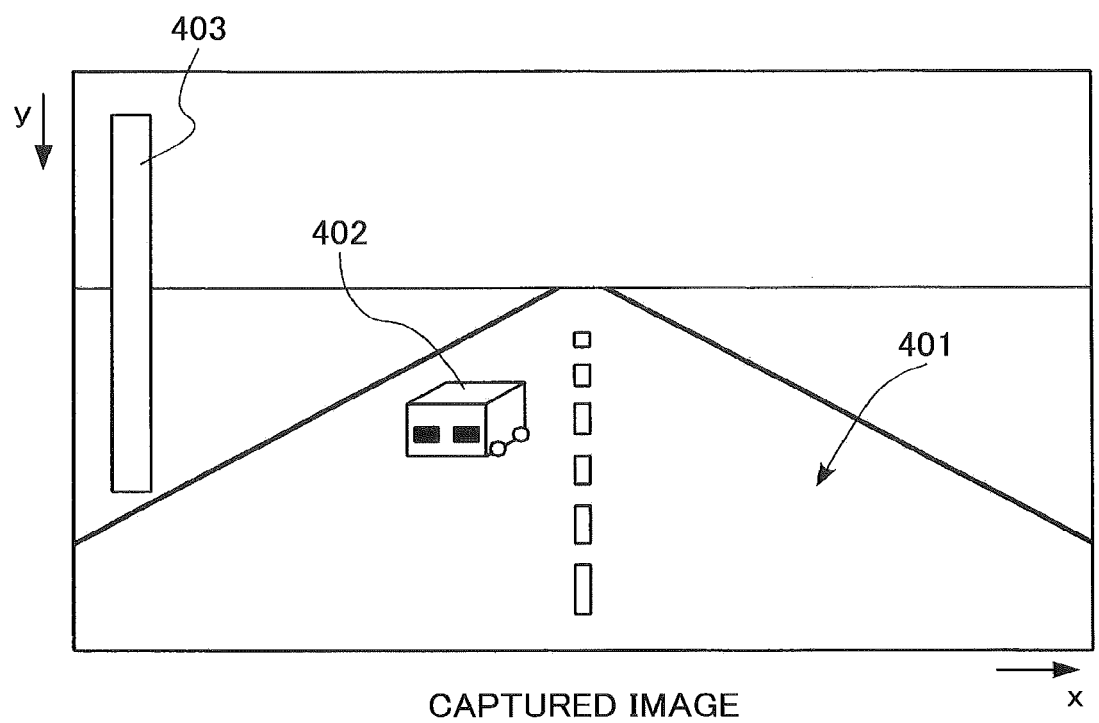
FIG. 6A is a diagram illustrating an example of a captured image as a reference image captured by one imaging part.
Figure 6B:
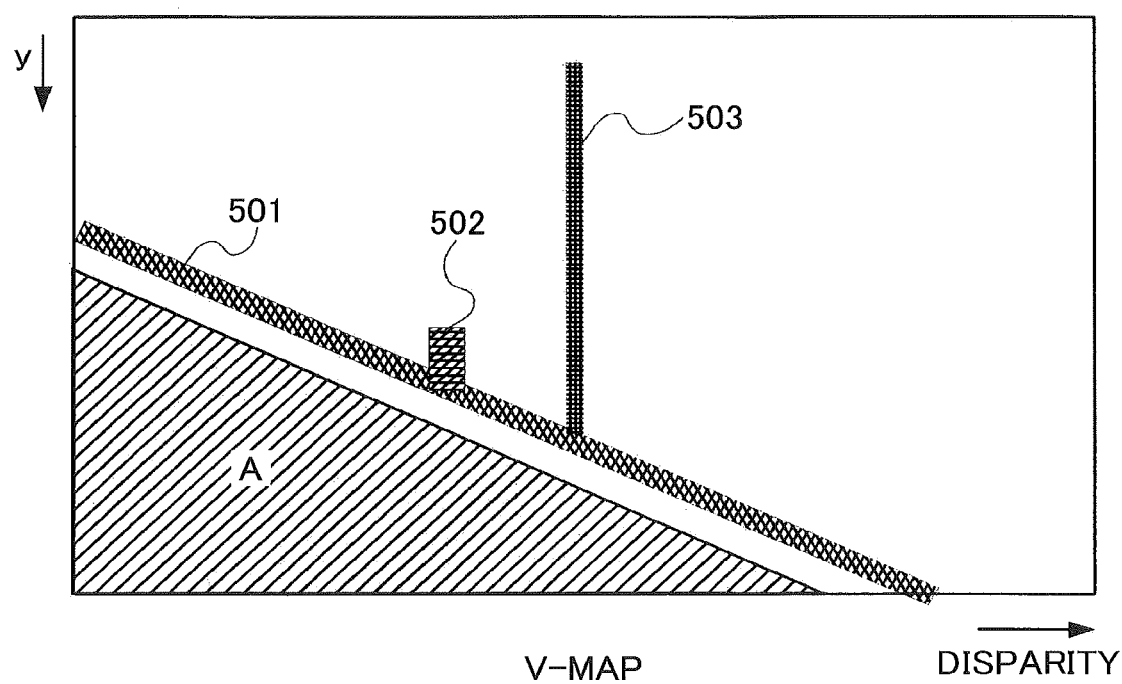
FIG. 6B is a diagram illustrating an example of a V-map corresponding to the captured image of FIG. 6A.

FIGS. 6A and 6B are diagrams illustrating an example of a captured image as a reference image captured by one imaging part, and an example of a V-map corresponding to the captured image in FIG. 6A, respectively. Note that FIG. 6A depicts the captured image, and FIG. 6B depicts the V-map. That is, the V-map illustrated in FIG. 6B is generated from the captured image as illustrated in FIG. 6A. In the V-map, no parallax is detected in a region below the road surface, and the parallax is not counted in a shaded region A.

The example of an image in FIG. 6A depicts a road surface 401 on which the reference vehicle is traveling, a preceding vehicle 402 existing ahead of the reference vehicle, and a utility pole 403 existing off the road. The V-map in FIG. 6B depicts a road surface 501, a preceding vehicle 502, and a utility pole 503 corresponding to the example of the image of FIG. 6A.

In the example of the image in FIG. 6A, a relatively flat road surface of the road surface ahead of the reference vehicle 100 matches a virtual reference road surface (virtual reference traveling surface). In other words, a road surface ahead of the reference vehicle 100, which extends parallel to a road surface portion directly beneath the reference vehicle 100 toward a frontward direction of the reference vehicle, matches a virtual reference road surface (virtual reference traveling surface). In this case, in a lower part of the V-map corresponding to a lower part of the image, high frequency points (the road surface 501) are distributed in a substantially linear manner with the inclination such that the disparity value d decreases toward the upper part of the image. Pixels indicating such distribution are present at approximately the same distance in each row on the parallax image, have the highest occupancy rate, and furthermore reflect a detection target having a distance becoming continuously farther toward the upper part of the image.

The imaging part 510a captures an image in a forward region of the reference vehicle, and content of the captured image indicates, as illustrated in FIG. 6B, that the disparity value d of the road surface decreases toward the upper part of the image in FIG. 6A. Further, the pixels displaying the road surface have substantially the same disparity value d within the same row (horizontal line). Accordingly, the high frequency points (road surface 501) distributed in a substantially linear manner on the V-map correspond to the features of the pixels that display the road surface (vehicle traveling surface). Hence, pixels of points distributed on or near an approximate straight line obtained by linear approximation of high frequency points on the V-map may be estimated as pixels reflecting the road surface with high accuracy. Further, the distance to the road surface portion displayed in each pixel may be obtained with high accuracy from the disparity value d of the corresponding point on the approximate straight line.

The V-map generation unit 121 may generate a V-map using only pixels in a predetermined region (e.g., a region that may reflect a road surface) in a parallax image, or may generate a V-map using all the pixels in the parallax image.

Figure 7A:
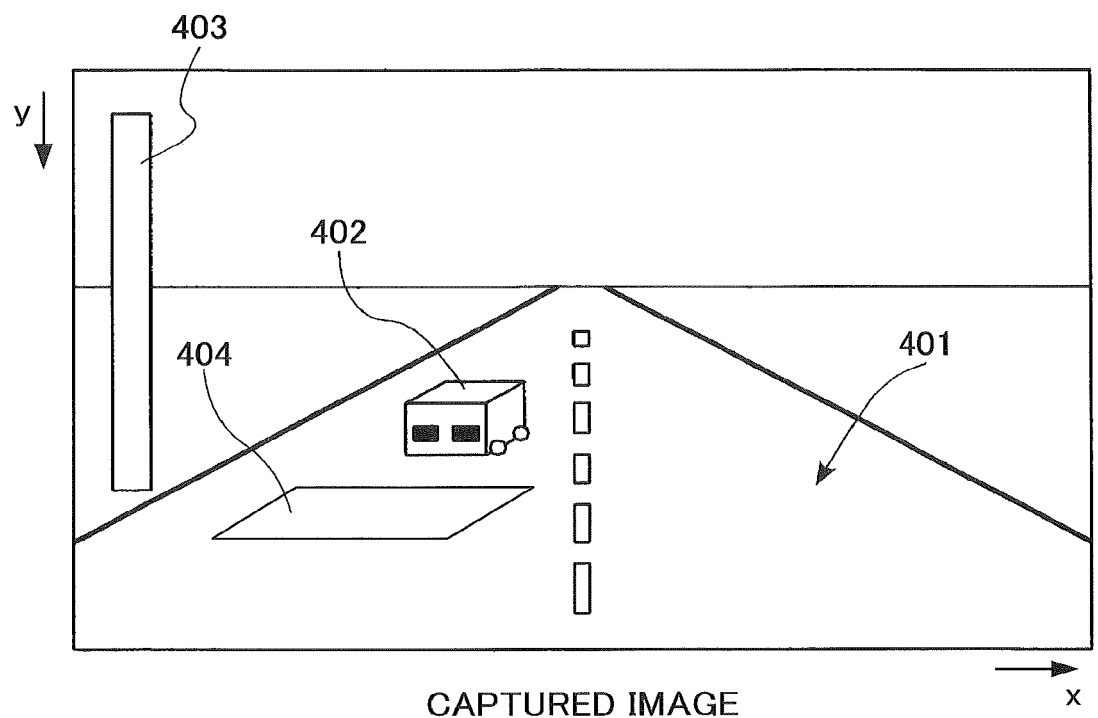
FIG. 7A is a diagram illustrating an example of a captured image as a reference image captured by one imaging part when noise is generated.
Figure 7B:
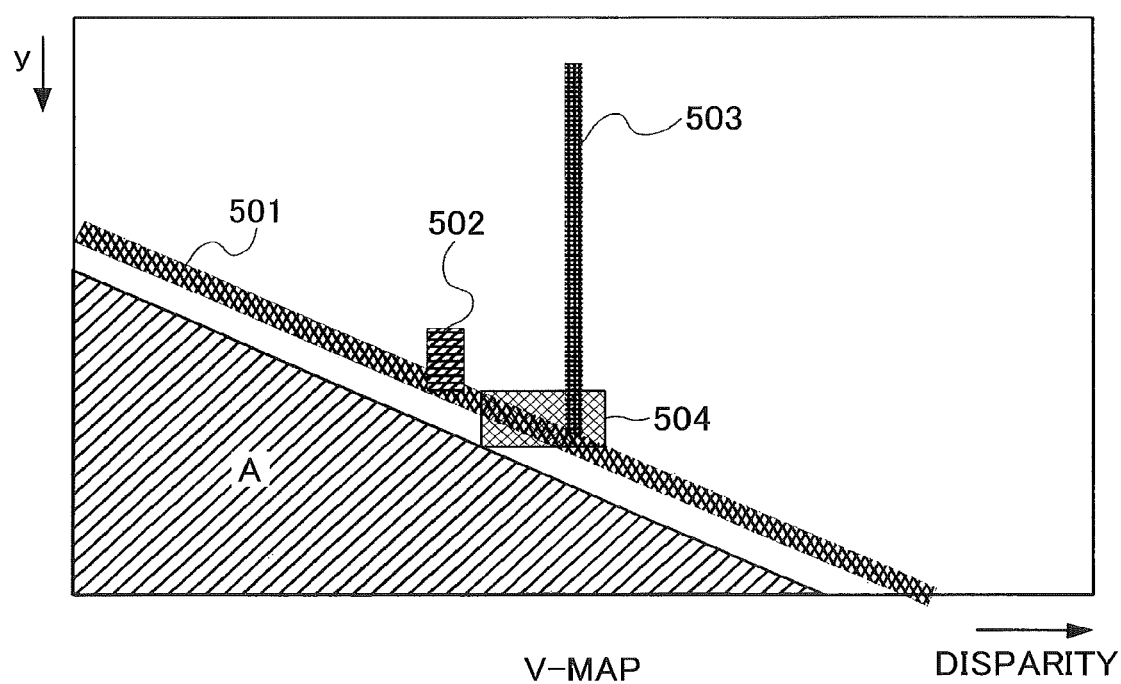
FIG. 7B is a diagram illustrating an example of a V-map in a predetermined region corresponding to the captured image of FIG. 7A when noise is generated.

FIGS. 7A and 7B are diagrams illustrating an example of a captured image as a reference image captured by one imaging part when noise is generated, and an example of a V-map corresponding to the captured image, respectively.

In the examples of FIGS. 7A and 7B, a reflected light 404 from a puddle or the like is depicted in FIG. 7A, compared to the examples of FIG. 6A and FIG. 6B, respectively. Further, a reflected light 504 from a puddle or the like is presented in the V-map depicted in FIG. 7B. As depicted in FIGS. 7A and 7B, when reflected light is generated, erroneous matching or the like occurs for calculating disparity even with parallax on the same road surface. As a result, a disparity value diffing from the original disparity will be calculated. In such a case, the parallax of the road surface is dispersed in the lateral (horizontal) direction as 504 in FIG. 7B.

<<Sample Point Extraction Process>>

The sample point extraction unit 122 extracts sample points used for estimating a road surface from a V-map generated by the V-map generation unit 121.

The following describes examples in which the V-map is divided into a plurality of segments according to a disparity value (i.e., a distance value from the reference vehicle), and the sample point extraction process, the road surface shape detection process, and the like described later are performed. However, the sample point extraction process, the road surface shape detection process, and the like may be performed without dividing the V-map.

Figure 8:
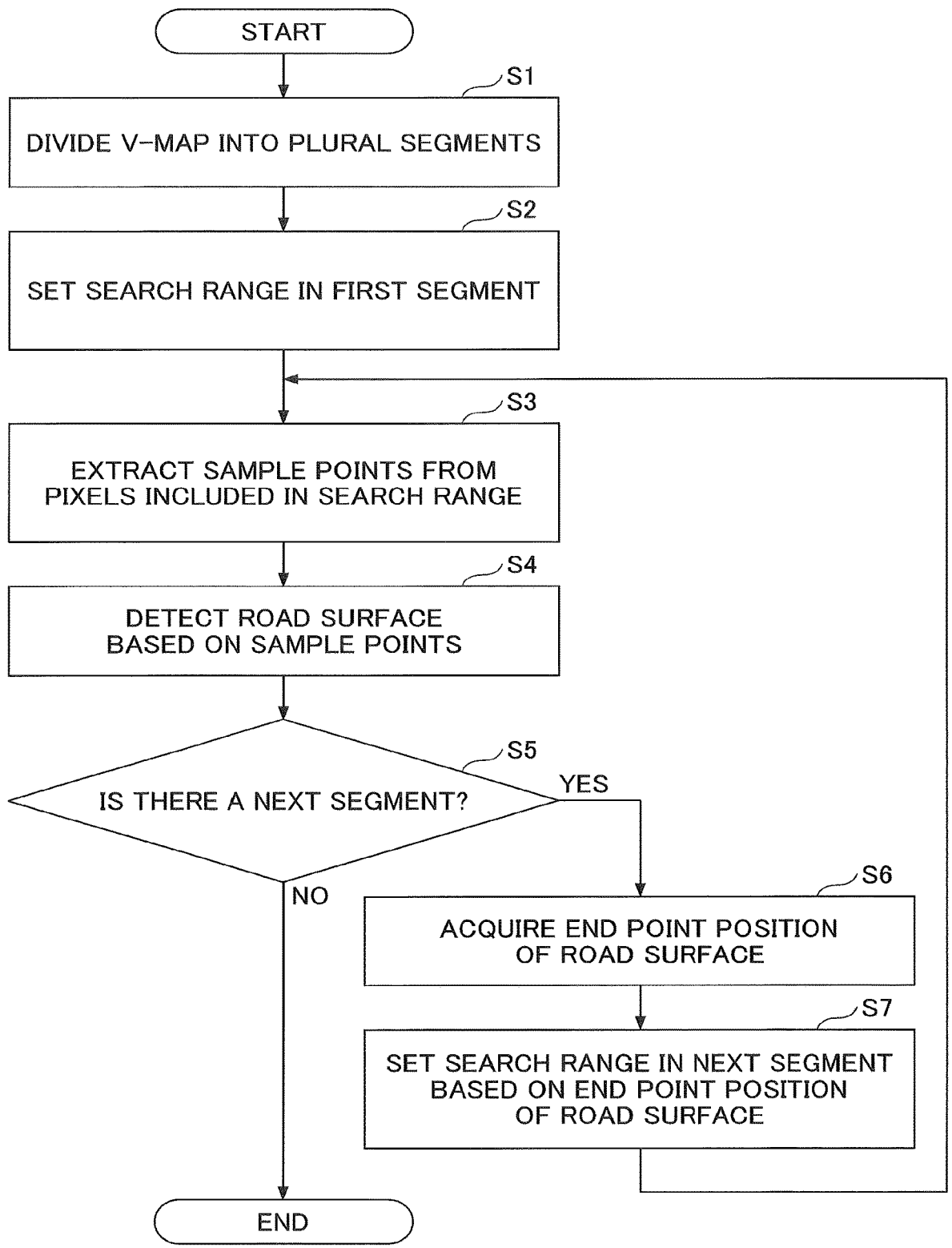
FIG. 8 is a flowchart illustrating an example of a sample point extraction process.

Next, a detailed example of the sample point extraction process performed by the sample point extraction unit 122 will be described with reference to FIGS. 8 to 11. FIG. 8 is a flowchart illustrating an example of the sample point extraction process.

First, the sample point extraction unit 122 divides a V-map into a plurality of segments according to disparity values corresponding to the horizontal axis of the V-map (step S1).

Subsequently, the sample point extraction unit 122 sets a range (search range) for searching for a sample point to be extracted in a segment (first segment) having the largest disparity value (the closest distance from the reference vehicle) (step S2).

Figure 9:
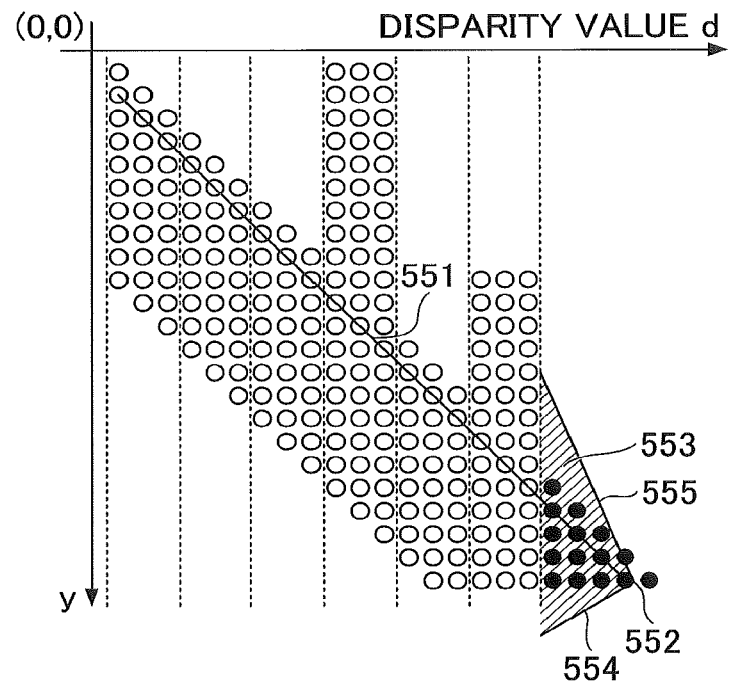
FIG. 9 is a diagram illustrating an example of a process of extracting sample points from a first segment.

FIG. 9 is a diagram illustrating an example of a process of extracting sample points from a first segment.

For example, in the first segment, the sample point extraction unit 122 determines, for example, a start point position 552 of a straight line corresponding to a default road surface 551 ("preset road surface") as a reference point, and sets a predetermined range corresponding to the reference point as a sample point search region 553. The data on the default road surface is preset, for example, when a stereo camera is attached to the reference vehicle. For example, data on a flat road surface may be set.

For example, as illustrated in FIG. 9, the sample point extraction unit 122 may determine a search region 553 to be an interval between two straight lines 554 and 555 extending from the reference point acting as a start point to an adjacent segment at a predetermined angle. In this case, the sample point extraction unit 122 may determine the two straight lines 554 and 555 in accordance with an angle at which the road surface is allowed to be inclined. For example, the sample point extraction unit 131 may determine the lower straight line 554 with respect to inclination of a downhill road surface that may be captured by the stereo camera, and may determine the upper straight line 555 with respect to the upper limit of inclination of an uphill road surface prescribed by law or the like. Alternatively, the sample point extraction unit 122 may set the search region 553 to be, for example, a rectangular region.

Subsequently, the sample point extraction unit 122 extracts a sample point from among pixels included in the search range (step S3). The sample point extraction unit 122 may extract one or more sample points from among the pixels included in the search range, for example, for each of coordinate positions of disparity values d. Alternatively, the sample point extraction unit 122 may extract the most frequently occurring point indicating the highest frequency (mode) at a coordinate position of each disparity value d as a sample point from among the pixels included in the search range. Or, the sample point extraction unit 122 may extract, from among the pixels included in the search range, the most frequently occurring point indicating the highest frequency (mode) at a plurality of coordinate positions including a disparity value d (e.g., the coordinate position of each disparity value d and one or more coordinate positions of at least left or right of the disparity value d) as a sample point.

Subsequently, the outlier removal unit 123, the road surface shape detecting unit 124, and the road surface complement unit 125 detect a road surface in the segment including the sample points, based on the sample points extracted in step S3 (step S4).

Subsequently, the sample point extraction unit 122 determines whether there is a next segment (e.g., a segment having the next smallest disparity value) (step S5), and when there is no next segment (NO in step S5), the sample point extraction unit 131 ends the process.

When there is a next segment (YES in step S5), the sample point extraction unit 122 acquires an end point position of the road surface detected in step S4 (step S6).

Subsequently, in the next segment, the sample point extraction unit 122 sets a search range, based on the end point position of the road surface acquired in step S5 (step S7), and proceeds to a process in step S3.

Figure 10A:
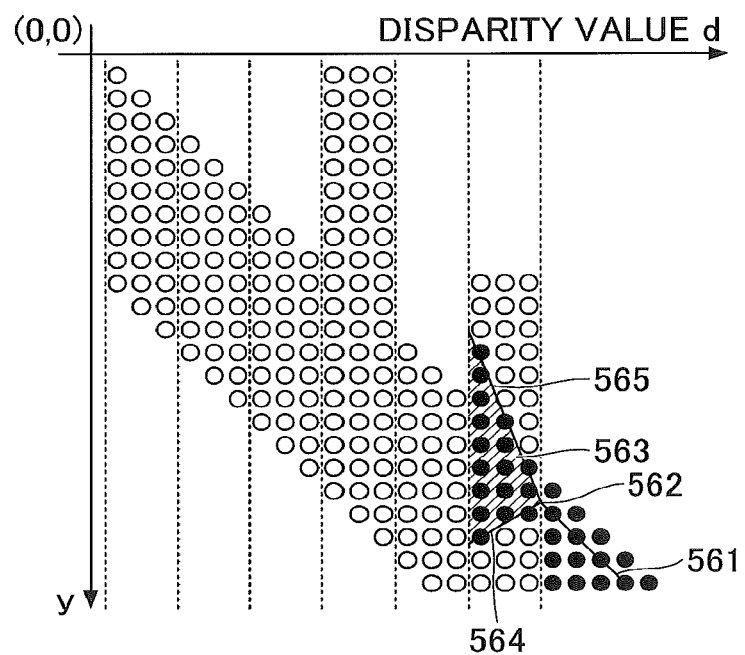
FIG. 10A is a diagram illustrating an example of a process of extracting sample points from a second segment.
Figure 10B:
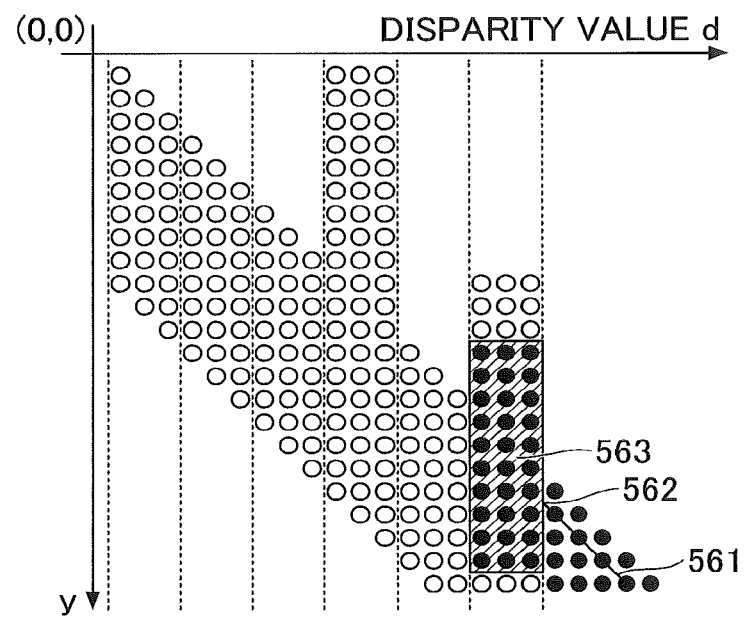
FIG. 10B is a diagram illustrating an example of a process of extracting sample points from the second segment.

FIGS. 10A and 10B are diagrams illustrating an example of a process of extracting sample points from a second segment other than the first segment. For example, in the second segment, the sample point extraction unit 122 sets an end point position (a position at which the road surface 561 of the previous segment contacts the second segment) of the road surface 561 of the previous segment (a segment adjacent to the second segment and from which the road surface has been already detected) as a reference point 562. Then, as is the case of step S2 illustrated in FIG. 9, the sample point extraction unit 122 sets a predetermined range corresponding to the reference point 562 as a sample point search region 563.

For example, as illustrated in FIG. 10A, the sample point extraction unit 122 may determine a search region 563 to be an interval between two straight lines 564 and 565 extending from the reference point acting as a start point to an adjacent segment at a predetermined angle. In this case, the sample point extraction unit 122 may determine the two straight lines 564 and 565 in accordance with an angle at which the road surface may be inclined. Alternatively, the sample point extraction unit 122 may set the search region 563 to be a rectangular region having a height corresponding to the y coordinate of the reference point 562, as illustrated in FIG. 10B.

Modification

Figure 11:
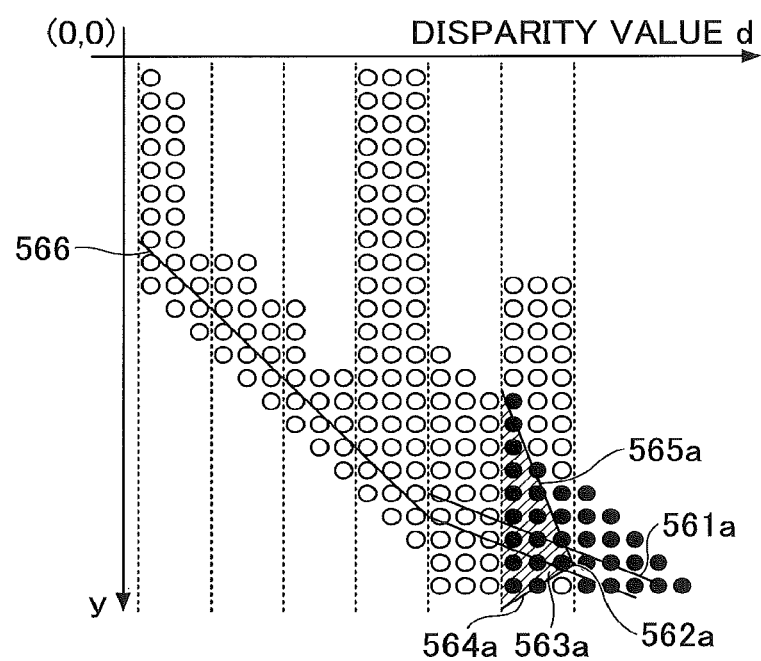
FIG. 11 is a diagram illustrating another example of a process of extracting sample points from the second segment.

FIG. 11 is a diagram illustrating another example of a process of extracting sample points from the second segment.

For example, in the second segment, the sample point extraction unit 122 sets an end point position of a road surface (history road surface) 561a of the segment adjacent to the second segment detected in a frame of the previous parallax image as a reference point 562a. Then, the sample point extraction unit 122 sets a predetermined range corresponding to the reference point 562a as a sample point search region 563a.

As a result, as illustrated in FIG. 11, in the case where a difference between the default road surface and the correct (actual) road surface 566 is large, for example, on a road surface of a downward slope, a more appropriate search range may be set compared with the case where the end point position of the road surface is set as the reference point as illustrated in FIGS. 10A and 10B.

Note that as the history road surface, the road surface detected in one previous frame may be used, or the average of the road surfaces detected in the plurality of previous frames may be used.

<<Outlier Removal Process>>

The outlier removal unit 123 removes a sample point that is not suitable for linear approximation from among the sample points extracted by the sample point extraction unit 122.

Figure 12:
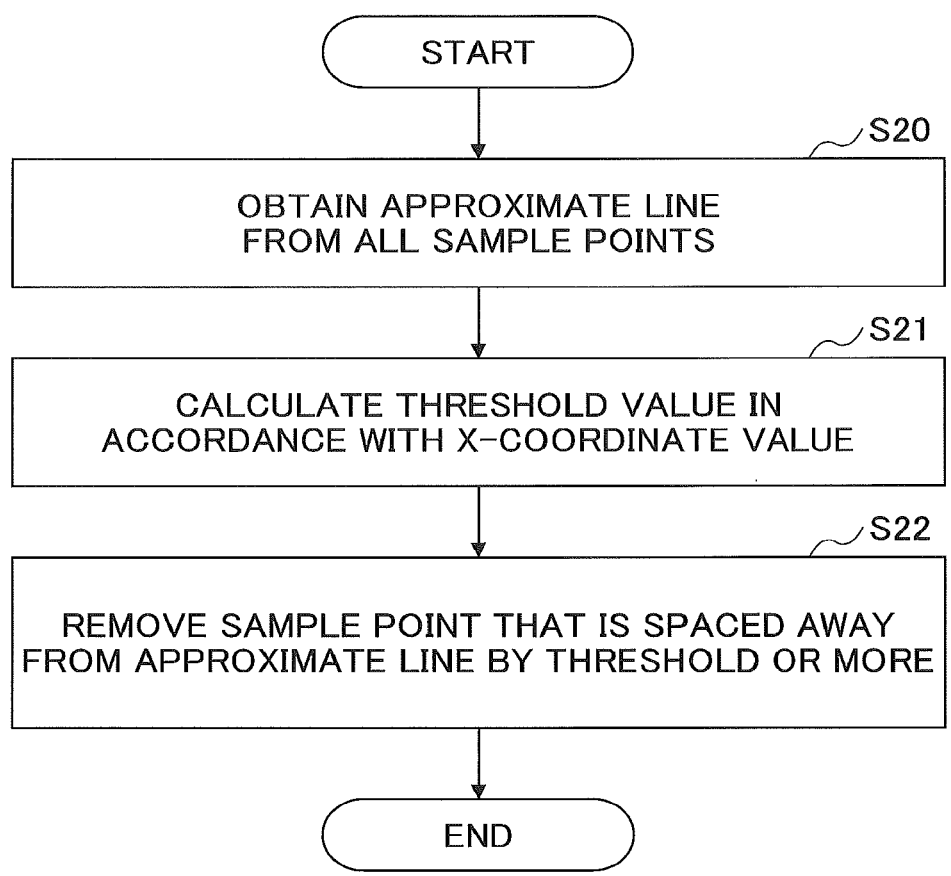
FIG. 12 is a flowchart illustrating an example of an outlier removal process.
Figure 13:
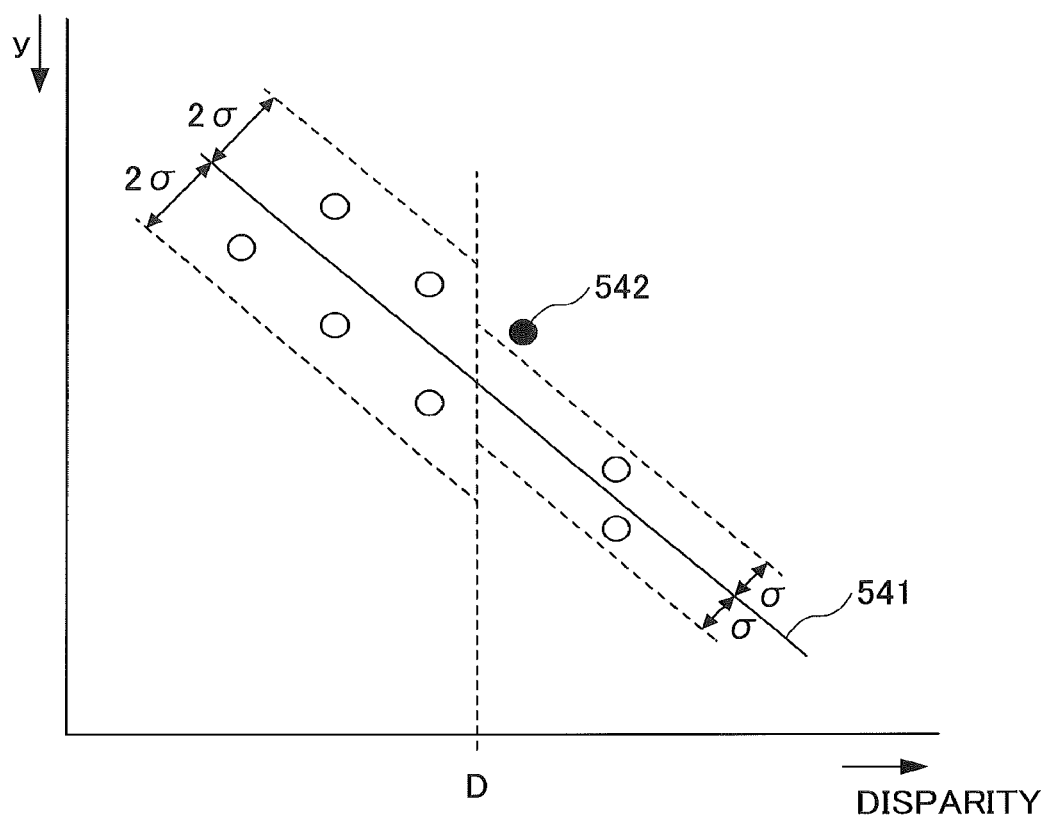
FIG. 13 is a diagram illustrating a process of removing an outlier.

The following illustrates an outlier removal process performed by the outlier removal unit 123 with reference to FIGS. 12 and 13. FIG. 12 is a flowchart illustrating an example of an outlier removal process. FIG. 13 is a diagram illustrating a process of removing an outlier.

First, the outlier removal unit 123 calculates an approximate straight line from the sample points of each segment extracted by the sample point extraction unit 122 or from the sample points of all segments (step S20). The outlier removal unit 123 calculates an approximate straight line using, for example, a least squares method. In the example of FIG. 13, the approximate straight line 541 is calculated in step S20 in FIG. 12.

Subsequently, the outlier removal unit 123 calculates a threshold value according to a value of an X coordinate (step S21). In the example of FIG. 13, with a predetermined X coordinate value D (e.g., a disparity value corresponding to a distance of 50 m from the reference vehicle) as a boundary, a predetermined value $2\sigma$ is set to X coordinate values less than the predetermined X coordinate value D (a predetermined distance farther from the reference vehicle), and a predetermined value $\sigma$ is set to X coordinate values having the predetermined X coordinate value D or more (a predetermined distance or less from the reference vehicle). This is because the threshold for removing an outlier needs to be relaxed because an error generated when measuring with a stereo camera is large for the road surface where the disparity values are small, that is, for the distance from the reference vehicle being long.

Subsequently, the outlier removal unit 123 removes a sample point having the Euclidean distance being equal to or greater than the threshold value calculated in step S21 with respect to the calculated approximate straight line (step S22). In the example of FIG. 13, the sample point 542 having an X coordinate value equal to or greater than D and being separated by a predetermined threshold a or more is removed. For example, for a value greater than or equal to D, σ may be set in two or more places, and α may be calculated and set as a function of disparity d.

<<Road Surface Shape Detection Process>>

The road surface shape detection unit 124 detects a shape (position, height) of the road surface from each segment of the V-map generated by the V-map generation unit 121, based on the sample points extracted by the sampling point extraction unit 122 and not removed by the outlier removal unit 123.

The road surface shape detection unit 124 calculates an approximate straight line from the sample points of each segment, for example, by a least squares method, and detects (estimates) the calculated approximate straight line as a road surface.

<<Road Surface Complement Process>>

The road surface complement unit 125 determines whether the road surface detected (estimated) by the road surface shape detection unit 124 is inappropriate. When the road surface complement unit 125 determines that the detected road surface is inappropriate, the road surface complement unit 125 complements the road surface. The determination as to whether the detected road surface is inappropriate may be made based on not only the determination on the angle of the road surface but also a case where the score used for the estimation is smaller than a predetermined threshold value or a case where the correlation coefficient when approximating by the least squares method is smaller than a predetermined value (when the point group variability is large).

The road surface complement unit 125 determines whether an inappropriate road surface that is impossible to be captured by a stereo camera has been estimated due to noise. When the road surface complement unit 125 determines that an inappropriate road surface has been estimated, the road surface complement unit 125 complements (interpolates) the inappropriate road surface, based on a default road surface or road surface data estimated in the previous frames.

In the V-map, for example, when data of a steeply left-side upward-sloping road surface having part of the gradient being a predetermined value or more is detected, the road surface road surface complement unit 125 assumes that the road surface is a downhill slope with a steep gradient as the distance from the reference vehicle increases. Then, the road surface complement unit 125 removes the data of the road surface and complements the removed road surface data with data such as a default road surface instead.

<<Smoothing Process>>

The smoothing process unit 126 corrects a road surface estimated in each segment such that the estimated road surfaces are continuous. The smoothing process unit 126 changes inclination and intercept of each of the road surfaces such that an end point (endpoint) of one of the road surfaces estimated in the two adjacent segments matches a start point (endpoint) of the other road surface.

<<Road Surface Height Table Calculation Process>>

The road surface height table calculation unit 127 performs a road surface height table calculation process of calculating a road surface height (a relative height with respect to the road surface portion directly beneath the reference vehicle), based on the road surface in each segment corrected by the smoothing process unit 126, and converting calculated results into a table.

The road surface height table calculation unit 127 calculates a distance to each road surface portion displayed in each row region (each position in the vertical direction of an image) on the captured image from information on the road surface in each segment. It is predetermined which row region in the captured image is to display each road surface portion in a vehicle traveling direction of a virtual plane, which is obtained by extending a road surface portion located directly beneath the reference vehicle in a forward traveling direction of the reference vehicle in parallel with the road surface portion. This virtual plane (reference road surface) is represented by a straight line (reference straight line) on the V-map. The road surface height table calculation unit 127 may obtain the height of each road surface portion ahead of the reference vehicle by comparing the road surface in each segment with the reference straight line. The road surface height table calculation unit 127 may simply calculate the height of the road surface portion existing ahead of the reference vehicle by the distance from the Y axis position on the road surface in each segment obtained from the corresponding disparity value. The road surface height table calculation unit 127 tabulates the height of each road surface portion obtained from the approximate straight line with respect to the necessary disparity range.

Note that the height of an object displayed on the captured image portion corresponding to a certain point where the Y axis position is y' at a disparity value d from the road surface may be calculated from (y'−y0) when the Y-axis position on the road surface at the disparity value d is y0. In general, the height H of the object corresponding to the coordinates (d, y') on the V-map from the road surface may be calculated from the following formula. Note that "Z" in the following formula is a distance (Z=BF/(d-offset)) calculated from the disparity value d, and "f" is a value obtained by converting a focal distance of a camera into the same unit as that of (y'−Y0). Note that "BF" is a value obtained by multiplying the baseline length of a stereo camera by the focal length, and "offset" is a disparity value when an object at infinity is imaged.

$$H = z \times (y'-y0)/f$$

<Clustering, Rejection, Tracking>

A clustering unit 13 generates XY two-dimensional histogram information (frequency U-map) by setting a set (x, y, d) of λ being an x direction position, y being a y direction position, and d being a parallax value d in each parallax pixel data included in the parallax image data, such that x is set on the X axis, d is set on the Y axis, and the frequency is set on the Z axis.

The clustering unit 13 generates a frequency U-map only for the points (x, y, d) of the parallax image in which the height H from the road surface is within a predetermined height range (e.g., 20 cm to 3 m), based on the height of each road surface portion tabulated by the road surface height table calculation unit 127. In this case, it is possible to appropriately extract an object existing in the predetermined height range from the road surface.

In the frequency U-map, the clustering unit 13 detects, as an object region, a region where the frequency is greater than a predetermined value and the parallax is dense, and assigns, to the object region, individual information, such as coordinates on the parallax image and a type (human or pedestrian) of an object predicted from the actual size (size) of the object.

The rejection unit 14 rejects information on an object that is not a recognition target based on the parallax image, the frequency U-map, and the individual information of the object.

A tracking unit 15 determines whether the detected object is a tracking target when the detected object appears consecutively in frames of a plurality of parallax images.

<Traveling Support Control>

A control unit 139 may, for example, send an alert sign to a driver of the reference vehicle 100 or perform traveling support control (driving support control) such as control of the steering wheel and braking of the reference vehicle, based on the detection result of the object by the clustering unit 13.

Overview

When noise is generated in parallax due to reflection of the road surface during rainy weather, an estimated road surface may be too low or too high with respect to the correct road surface. When the estimated road surface is too low, a part of the road surface may be erroneously recognized as an obstacle. When the estimated road surface is too high, an obstacle or the like lower than the estimated road surface will not be detected in some cases.

According to the above-described embodiment, in the V-map, a search range corresponding to a predetermined reference point is set, a plurality of pixels are extracted from the search range, and a road surface is detected based on the extracted plurality of pixels. This makes it possible to improve the accuracy of detecting a road surface.

Note that since a value of a distance (distance value) and a disparity value may be handled equivalently, a parallax image is used as an example of a range image in the present embodiments; however, the present invention is not limited to this example. For example, a range image may be generated by integrating distance information generated by using a detection device such as millimeter wave radar or laser radar with respect to a parallax image generated by using a stereo camera. Further, a combination of a stereo camera and a detection device such as millimeter wave radar or laser radar may combine a detection result of an object obtained by the detection device with the detection result of the object obtained by the above-described stereo camera to further improve detection accuracy.

The system configuration in the above-described embodiments is merely an example, and various examples of the system configuration may also be applied according to intended use and purposes.

For example, because the processes of the outlier removal unit 123, the road surface complement unit 125, the smoothing process unit 126 and the like are not indispensable, the system configuration may exclude these functional units.

In addition, respective functional units of the process hardware unit 510, the image analysis unit 600, and the vehicle traveling control unit 104 may be implemented by hardware, or may be implemented by a CPU executing a program stored in a storage device. The above-described program may be distributed in a form of a computer-readable recording medium storing the program in files of an installable format or executable format. Or other examples of the recording medium may include a compact disc recordable (CD-R), a digital versatile disk (DVD), and a Blu-ray Disc. The above-described recording media that store the above-described programs such as a CD-ROM, and an HD 504 that store these programs may be provided domestically or internationally as a program product.

ADVANTAGE OF THE INVENTION

According to the disclosed technique, it is possible to improve the accuracy of detecting a road surface.

Although the present invention has been described based on the embodiments, the present invention is not limited to the above-described embodiments, and various modifications may be made within the scope described in the claims.

What is claimed is:

1. An image processing apparatus comprising:
   one or more processors; and
   a memory, the memory storing instructions, which when executed by the one or more processors, cause the one or more processors to:
   generate vertical direction distribution data indicating a frequency distribution of distance values with respect to a vertical direction of a range image, from the range image having distance values according to distance of a road surface in a plurality of captured images captured by a plurality of imaging sensors;
   set a search range corresponding to a predetermined reference point in the vertical direction distribution data and extract a plurality of pixels from the search range; and
   detect the road surface, based on the plurality of extracted pixels,
   wherein to set the search range, the instructions further cause the one or more processors to:
   divide the vertical direction distribution data into a first segment and a second segment according to the distance values,
   determine the predetermined reference point in the second segment according to the road surface detected in the first segment, and
   set the search range of the second segment to be a rectangular region having a height corresponding to a y coordinate of the predetermine reference point.

2. The image processing apparatus according to claim 1, wherein to set the search range, the instructions further cause the one or more processors to:
   determine the predetermined reference point according to the detected road surface or a preset road surface based on the plurality of captured images captured previously.

3. The image processing apparatus according to claim 1, further comprising an imaging device including:
   the plurality of imaging sensors configured to capture the plurality of images;
   one or more processors of the imaging device; and
   a memory of the imaging device, the memory storing instructions, which when executed by the one or more processors of the imaging device, cause the one or more processors of the imaging device to:
   generate the range image having the distance values according to parallax of the road surface in the plurality of captured images, from the plurality of captured images captured by the plurality of imaging sensors;
   generate the vertical direction distribution data indicating the frequency distribution of the distance values with respect to the vertical direction of the range image;
   set the search range corresponding to the predetermined reference point in the vertical direction distribution data and extract the plurality of pixels from the search range; and detect the road surface, based on the plurality of extracted pixels.

4. The image processing apparatus according to claim 1, wherein the one or more processors further perform an outlier removal process to remove from the plurality of pixels that are not suitable for linear approximation.

5. A moving body device control system comprising:
a plurality of imaging sensors installed in a moving body and configured to image a view ahead of the moving body;
one or more processors; and
a memory, the memory storing instructions, which when executed by the one or more processors, cause the one or more processors to:
generate a range image having distance values according to parallax of a road surface in a plurality of captured images, from the plurality of captured images captured by the plurality of imaging sensors;
generate vertical direction distribution data indicating a frequency distribution of the distance values with respect to a vertical direction of the range image;
set a search range corresponding to a predetermined reference point in the vertical direction distribution data, and extract a plurality of pixels from the search range;
detect the road surface, based on the plurality of extracted pixels;
detect an object in the plurality of captured images, based on the detected road surface and the range image; and
control the moving body, based on data on the detected object,
wherein to set the search range, the instructions further cause the one or more processors to:
divide the vertical direction distribution data into a first segment and a second segment according to the distance values,
determine the predetermined reference point in the second segment according to the road surface detected in the first segment, and
set the search range of the second segment to be a rectangular region having a height corresponding to a y coordinate of the predetermine reference point.

6. A moving body comprising:
the moving control device control system according to claim 5, wherein
the moving body is controlled by the moving control device control system.

7. A non-transitory computer readable medium storing instructions which, when executed by a computer, cause the computer to:
generate vertical direction distribution data indicating a frequency distribution of distance values with respect to a vertical direction of a range image, from the range image having distance values according to distance of a road surface in a plurality of captured images captured by a plurality of imaging sensors;
set a search range corresponding to a predetermined reference point in the vertical direction distribution data and extract a plurality of pixels from the search range; and
detect the road surface, based on the plurality of extracted pixels,
wherein the set of the search range further cause the computer to:
divide the vertical direction distribution data into a first segment and a second segment according to the distance values,
determine the predetermined reference point in the second segment according to the road surface detected in the first segment, and
set the search range of the second segment to be a rectangular region having a height corresponding to a y coordinate of the predetermine reference point.

* * * * *